UNITED STATES PATENT OFFICE.

HERBERT H. MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY.

METHOD OF TREATING PHOSPHATE-ROCK.

1,246,636.   Specification of Letters Patent.   Patented Nov. 13, 1917.

No Drawing.   Application filed January 15, 1917. Serial No. 142,372.

*To all whom it may concern:*

Be it known that I, HERBERT H. MEYERS, a citizen of the United States, residing in Pittsburgh, county of Allegheny, and State of Pennsylvania, have invented certain new and useful Improvements in Methods of Treating Phosphate-Rock; and I do hereby declare the following to be a full, clear, and exact description of the invention, such as will enable others skilled in the art to which it appertains to make and use the same.

This invention relates to the treatment of phosphate rock and of insoluble phosphatic material and to the conversion of the insoluble phosphates contained therein into available or soluble phosphates; and it comprises a novel method of treating the insoluble phosphatic material and the novel product resulting therefrom.

The naturally occurring phosphates contain the phosphatic material generally in the form of the insoluble tri-calcium phosphate $(Ca_3(PO_4)_2)$. Except in rare instances such naturally occurring phosphates are unfit for use directly as fertilizer. Before becoming available for such use, the insoluble phosphates must be converted by chemical means into a soluble or available condition, such as that of the mono-calcium phosphate $(CaH_4P_2O_8)$ or the di-calcium phosphate $(Ca_2H_2P_2O_8)$. When the phosphates are in the form of mono or di-calcium salts they are considered "available phosphates." These salts are also known as acid phosphates or super-phosphate.

The amount of available phosphates present in any mixture is commonly determined by their solubility in neutral ammonium citrate solution, according to the official method of the Official Agricultural Chemists' Association. This result is usually expressed as percentage of available $P_2O_5$.

The mono-calcium phosphate referred to above is soluble in water. The di-calcium phosphate referred to above is considered soluble in a solution of neutral ammonium citrate and is therefore classed as an available phosphate.

The method of treating phosphate rock and other insoluble phosphates which is at present almost universally in use for rendering such insoluble phosphates "available" commercially is the sulfuric acid method. According to this method, the insoluble phosphate is mixed with the requisite amount of dilute sulfuric acid to produce the acid salts in accordance with the following reactions:

$Ca_3(PO_4)_2 + H_2SO_4 = Ca_2H_2(PO_4)_2 + CaSO_4$ or

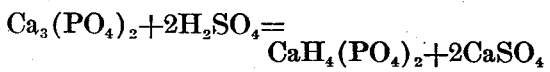

$Ca_3(PO_4)_2 + 2H_2SO_4 = CaH_4(PO_4)_2 + 2CaSO_4$

According to this method, starting with raw materials, it is necessary first to produce or obtain the sulfuric acid; and then to treat the insoluble phosphate with this acid; the production of the acid and the treatment of the insoluble phosphate thus forming two separate and distinct procedures.

This old sulfuric acid process of treating the insoluble phosphate rock is a reaction during which heat is developed. Owing to this development of heat and to the concentration of the acid used, the fluorids present are attacked as are also iron and aluminum compounds present in the rock. This is objectionable and even detrimental for several reasons. The hydrofluoric acid evolved causes very objectionable fumes which must be taken care of. The iron and alumina in the rock attacked by the acid tend to cause a reversion of some of the acid phosphate to the insoluble form. Moreover, the acid consumed in attacking the fluorids and in combining with the iron and aluminum is unavoidably wasted so far as the production of available phosphate is concerned, thus making it necessary to use an excess of the acid which is useless so far as the desired reaction is concerned.

The present invention relates to a new and improved method of treating phosphate rock and similar insoluble phosphates which is relatively free from such objections as those noted, and which will, moreover, convert the insoluble phosphate into a soluble or available form in a particularly advantageous manner. The present invention further comprises a novel method according to which sulfuric acid or sulfuric anhydrid is produced as it is used, or rather used as it is produced, with accompanying sulfurous acid or anhydrid; so that there results at the end of the process a product of reaction of the isoluble phosphates with the mixture of gases containing sulfurous and sulfuric anhydrids, the reaction being carried out in the presence of water and of free oxygen.

If naturally occurring phosphates, for example, Tennessee phosphate rock are treated with sulfur dioxid diluted with air and in the presence of water, a small amount of the phosphate present is rendered available. Since sulfates can be detected in the finished product, the following reaction presumably occurs:

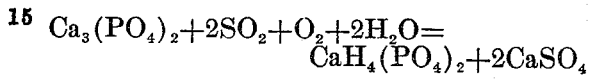
$$Ca_3(PO_4)_2 + 2SO_2 + O_2 + 2H_2O = CaH_4(PO_4)_2 + 2CaSO_4$$

However, the velocity of this reaction is so slow that it has been found impracticable to attempt to convert the phosphates present completely into the available form by this method.

According to the present invention, however, and after extended investigation, I have found that if the sulfur dioxid gas, diluted with air, preferably previously dried is first passed through a suitable catalyst so that a substantial proportion of it is converted into sulfur trioxid, and if the resulting gaseous mixture is brought into reactive relation with the phosphate rock in the presence of water, the desired reaction occurs much more quickly and completely. The sulfur dioxid and the sulfur trioxid in combination act on the insoluble phosphates in such a manner as to render them almost completely soluble or available.

It will be noted that the acid phosphates are thus produced without the intermediate production and isolation of sulfuric acid. Starting with the raw materials, the entire operation can be made continuous and can be effected as a single process or operation. The process is thus one of notable economy in labor and material as well as in the apparatus or plant required. Moreover, the sulfurous and sulfuric anhydrids are brought into reactive relation with the insoluble phosphatic material in the presence of water so that the reaction of the gases is thus made to take place at or immediately after their absorption in the water present. An action perhaps similar to that of the action of nascent acids is thus possible.

Furthermore, since the reaction is a gradual and progressive reaction with gradual and continuous production of the sulfuric acid anhydrid and gradual and continuous absorption of the gaseous products, the temperature of the reacting mass does not rise to any objectionable extent and the acid is maintained of very low concentration throughout the treatment. That is to say, the acid tends to react as soon as absorbed so that the further additions of acid tend merely to maintain the low concentration without undue accumulation of acid in solution and resulting concentration thereof. Objectionable decomposition of fluorids and production of fumes of hydrofluoric acid are thus prevented or minimized, while the consumption of acid is also decreased because of the fact that the chlorids and also the iron and aluminum compounds are not attacked, or are attacked but very little.

Pyrites is preferably burned as a source of sulfur dioxid in order that the cinder produced may be used as a catalyst, though various other catalysts are also available. When pyrites cinder is used as a catalyst, a temperature of 550 to 600° C. should be maintained in order to obtain the maximum conversion.

From the catalyzer tower the gases which consists of a proper mixture of sulfur dioxid, sulfur trioxid, oxygen and nitrogen are led by a proper arrangement of flues through reaction cylinders which contain the phosphate material to be treated. These cylinders are preferably wooden cylinders containing rotating paddles which agitate the phosphate material. Before introduction into the cylinders the phosphate material is preferably ground to a fine powder and mixed with water to form a sludge; and this sludge is then introduced through the tops of the cylinders by a suitable pipe-line or otherwise, and is agitated in the cylinders by the rotating paddles while the gases are passing through.

One or more cylinders or batteries of cylinders may be combined with a single pyrites burner and catalyzer tower, depending on the size of the burner and other considerations. The cylinders are so connected with each other and with the burner and tower that any one of them may be cut out of the system for discharging and recharging without interfering with the continuity of the process. The arrangement of the dampers and flues is also such that the direction of the gases through the system may be varied at will.

It will be evident that different types of apparatus are available for carrying out the procedure described and for effecting both the production of the mixture of sulfur trioxid and sulfur dioxid and bringing this mixture into reactive relation with the phosphatic material. For instance, in the conversion of $SO_2$ to $SO_3$, the greater the conversion, the higher the velocity of the reaction and the fewer cylinders required for the subsequent consumption of the reacting gases. Therefore, governed by considerations of economy it may, in some cases, be advisable to use catalysts other than pyrite cinder which will cause practically a complete conversion of the $SO_2$ into $SO_3$.

Where the reacting gases contain both $SO_2$ and $SO_3$ there results from their reaction with the phosphatic material a further conversion of $SO_2$ into $SO_3$ or of sulfites formed from the $SO_2$ into sulfates; and I have found that this formation of sulfates from the $SO_2$ is materially promoted by the use of a gaseous mixture containing in addition the sulfur trioxid and free oxygen. Whereas, as previously stated, $SO_2$ gas by itself is not an efficient reagent for rendering insoluble phosphatic material available, the sulfur dioxid contained in the gaseous mixture used according to the present invention becomes an effective agent which materially supplements the action of the $SO_3$ present, the $SO_2$ ultimately appearing to a material degree in the form of sulfates in the final product, although this product may also in certain cases still contain sulfites. Whether the gases used contain considerable amounts of sulfur dioxid or whether the sulfur dioxid has been nearly all converted into sulfur trioxid the process of the present invention according to which this gaseous mixture is used is of a gradual and progressive nature so far as the phosphate treatment is concerned; and the whole operation is, moreover, of a combined and unitary nature in that the gaseous mixture is utilized directly without the intermediate step of forming liquid sulfuric acid and utilizing the sulfuric acid so formed.

The product obtained according to the present invention, as will be evident from the foregoing description of the method of producing it, is one characterized by high conversion of insoluble phosphates into a soluble or available form, without such objectionable loss of sulfuric acid as is involved in the old processes because of its combination with iron and alumina and its decomposition of fluorids. The product of the present invention is thus characterized by the fact that the fluorids and the iron and alumina remain unattacked or are attacked but very little. The product is thus characterized by those properties which are inherent because of the advantages and differences in the method of its production, and is thus distinguished from the phosphate production of the prior art.

I claim:

1. The method of treating phosphate rock and other insoluble phosphatic material and of converting the insoluble phosphates thereof into available or soluble phosphates, which comprises treating the moist phosphatic material with a mixture of gases containing sulfurous and sulfuric anhydrids; substantially as described.

2. The method of treating phosphate rock and other insoluble phosphatic material and of converting the insoluble phosphates thereof into available or soluble phosphates, which comprises subjecting the moist phosphatic material to the combined action of sulfurous and sulfuric anhydrids in the presence of free oxygen; substantially as described.

3. The method of treating phosphate rock and other insoluble phosphatic material and of converting the insoluble phosphates thereof into available or soluble phosphates, which comprises treating the ground phosphatic material mixed with water to form a sludge with gases containing sulfur dioxid and sulfuric anhydrid and free oxygen; substantially as described.

4. The method of treating phosphate rock and other insoluble phosphatic material and of converting the insoluble phosphates thereof into available or soluble phosphates, which comprises treating the ground phosphatic material, in the presence of water, with sulfur dioxid gas containing sulfuric anhydrid and an excess of free oxygen; substantially as described.

5. The method of treating phosphate rock and other insoluble phosphatic material and of converting the insoluble phosphates thereof into available or soluble phosphates, which comprises subjecting the phosphatic material, in the presence of water, to the progressive and continuous action of gases containing sulfuric anhydrid, and thereby effecting the progressive and continuous conversion of the insoluble phosphatic material into the available or soluble phosphates; substantially as described.

6. The method of treating phosphate rock and other insoluble phosphatic material and of converting the insoluble phosphates thereof into available or soluble phosphates, which comprises conducting the sulfur dioxid gas suitably diluted with air over or through a suitable catalyst and thereby effecting conversion of the sulfur dioxid to a greater or less extent into sulfuric anhydrid, and bringing the resulting gaseous mixture into reacting relation with the phosphatic material in the presence of water; substantially as described.

7. The method of treating phosphate rock and other insoluble phosphatic material and of converting the insoluble phosphates thereof into available or soluble phosphates, which comprises burning sulfur-containing materials to produce a mixture of sulfur dioxid and air containing proper proportions of the sulfur dioxid and oxygen, passing the gaseous mixture over or through a suitable catalyst and thereby oxidizing a portion of the sulfur dioxid to sulfuric anhydrid, and subjecting the ground phosphatic material to the action of the resulting gaseous mixture in the presence of water; substantially as described.

8. As a new product, a fertilizer composition resulting from the action on an insoluble phosphatic material by a mixture of sulfurous and sulfuric anhydrids in the presence of water, said product containing a large proportion of available phosphate and having its original content of fluorids, iron and aluminum in a substantially unchanged condition, substantially as described.

In testimony whereof I affix my signature.

HERBERT H. MEYERS.